Aug. 20, 1940.    H. C. HAMANN    2,212,418
AIR HUMIDIFYING AND MOISTENING SYSTEM
Filed April 22, 1938    2 Sheets-Sheet 1
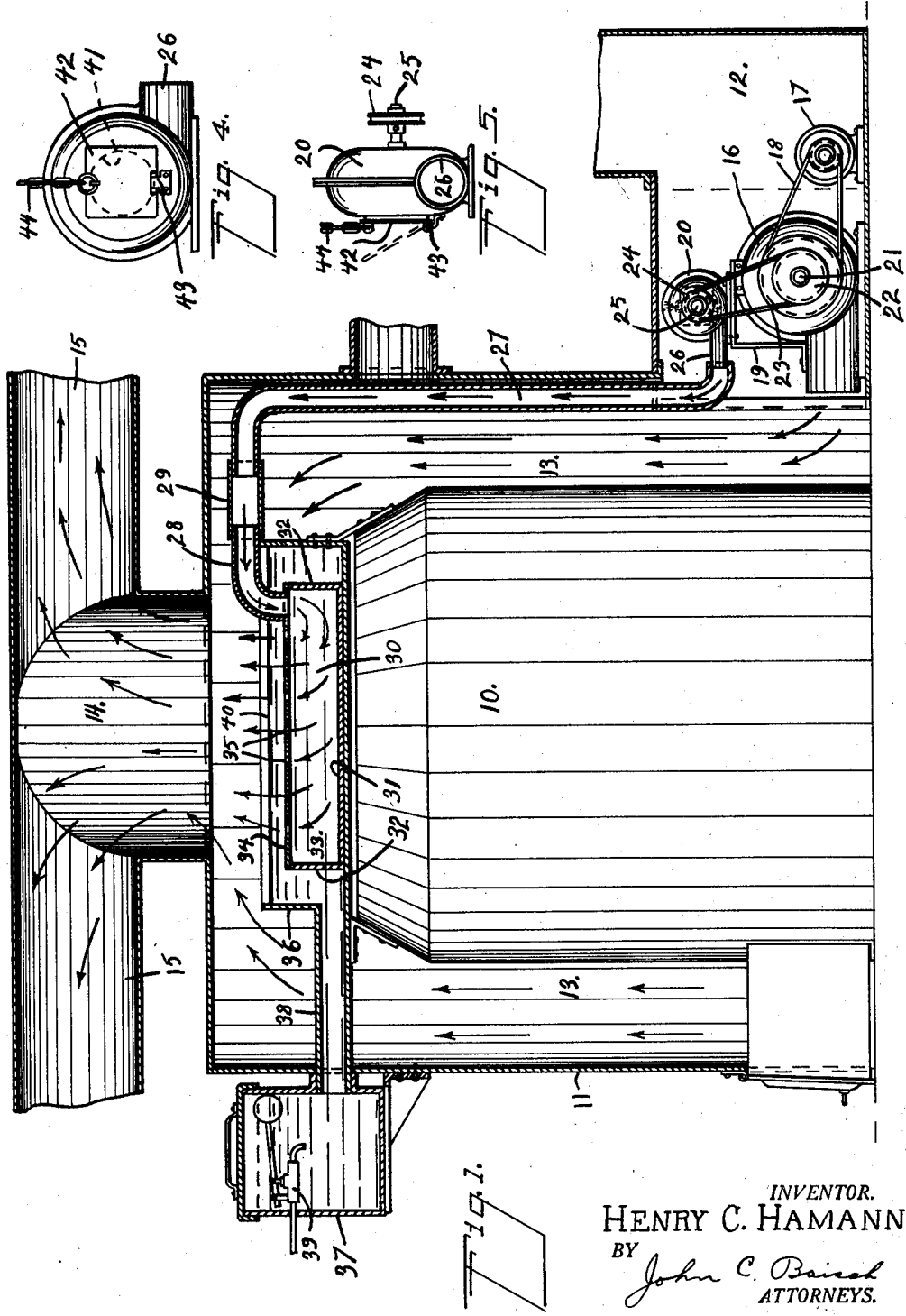
INVENTOR.
HENRY C. HAMANN.
BY
John C. Baisch
ATTORNEYS.

Aug. 20, 1940.　　　　H. C. HAMANN　　　　2,212,418
AIR HUMIDIFYING AND MOISTENING SYSTEM
Filed April 22, 1938　　　2 Sheets-Sheet 2
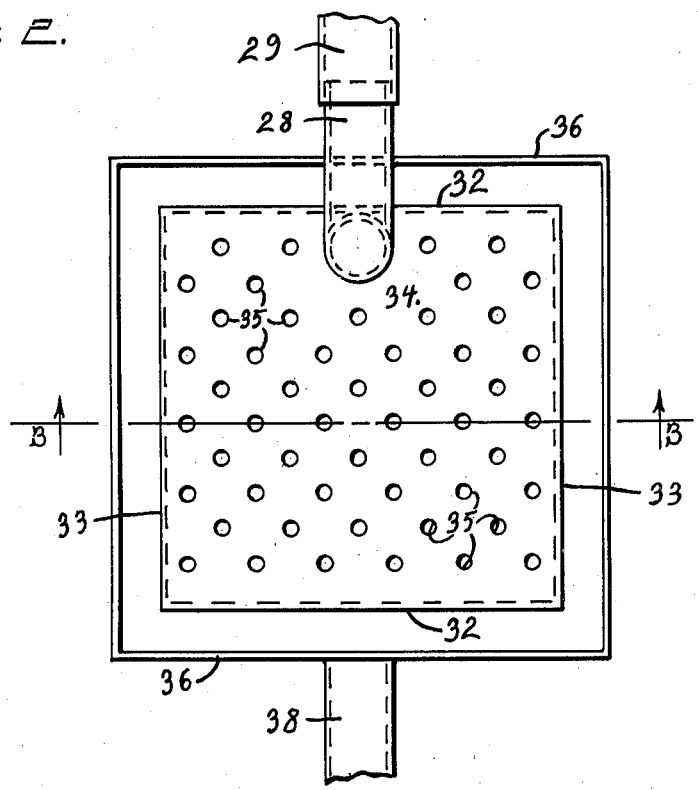
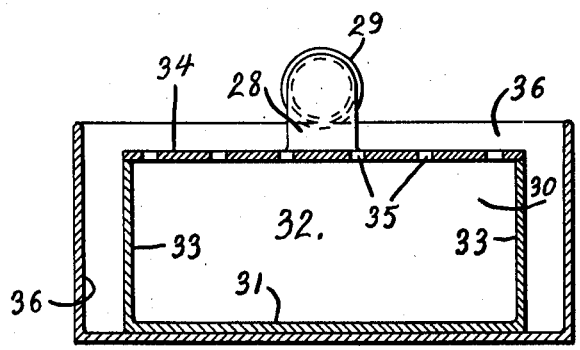
INVENTOR.
HENRY C. HAMANN.
BY　John C. Barsch
ATTORNEY.

Patented Aug. 20, 1940

2,212,418

UNITED STATES PATENT OFFICE 2,212,418

AIR HUMIDIFYING AND MOISTENING SYSTEM

Henry C. Hamann, Omaha, Nebr.

Application April 22, 1938, Serial No. 203,577

5 Claims. (Cl. 126—113)

This invention relates generally to air humidifying and moistening systems and particularly to systems of this character for use in buildings and the like.

Present humidifying systems, as far as I am aware, are not satisfactory in that the water spraying nozzles thereof become clogged with minerals and sediment contained in the water passing therethrough, and encrusted minerals on such nozzles, in the spraying chambers, are carried through the entire air circulating system in the form of a fine gray dust that will settle on furniture and the like and be breathed into the lungs of occupants of the buildings in which such systems are installed. Where evaporation troughs are used an insufficient amount of moisture is provided the air circulating system and as the water in such troughs is evaporated the level thereof is lowered and minerals become encrusted thereon which also enter the air stream in the form of a fine gray dust which is carried through the system.

It is therefore an important object of my invention to provide an air moistening and humidifying system or means whereby sufficient moisture is supplied to the air of the air circulating system of a house or other building.

It is another object of the invention to provide a system of this character whereby the amount of moisture supplied the air in the air circulating system can be easily controlled to provide the most satisfactory amount of moisture thereto.

Another object of the invention is to provide a system of this character wherein water-borne particles of foreign matter and the like will be effectively prevented from circulating through the system.

Further objects are to provide a submerged air spray, that will not become clogged, whereby air to be humidified is passed through the water in which the air spray is submerged and whereby said air will pick up moisture and become thoroughly humidified; to provide an auxiliary air current that is humidified and then mixed with the main current of air in the circulating system; to provide means whereby substantially all sediment entering the water of the water reservoir will be retained therein; and to provide means for maintaining a substantially constant level of water in the reservoir above the top of the air spray.

Further objects are to provide an air humidifying and moistening system that is simple in construction, efficient, economical and positive in operation, easy to install, and that will require little or no servicing.

Numerous other objects and advantages of the invention will be apparent as it is better understood from the following detailed description, which, taken in connection with the accompanying drawings, discloses a preferred embodiment thereof.

Referring to the drawings:

Figure 1 is a vertical section through an air heating and circulating system embodying my invention.

Figure 2 is an enlarged plan view of the water reservoir and air spray operably disposed therein.

Figure 3 is a section through same taken on line 3—3 of Figure 2.

Figure 4 is an enlarged side elevation of the auxiliary blower with air control means thereof for regulating the supply of air to said blower.

Figure 5 is an end elevation of same.

Referring more particularly to the drawings, which illustrate a preferred embodiment of my invention, reference numeral 10 indicates a furnace generally which has a casing 11 enclosing same. A cold air conduit 12 communicates with an air heating chamber 13, between the furnace 10 and casing 11, adjacent the bottom of said chamber. The air in the conduit 12 is forced through the heating chamber 12 and into the primary or main hot air duct 14, which is positioned centrally above the furnace, and branch hot air ducts 15 which carry the heated air to various parts of the building in which the system is installed, by a blower 16 driven by an electric motor 17 through a belt drive 18. A bracket 19 is secured to the blower 16 on which is mounted an auxiliary blower 20. Shaft 21 of the blower 16 is provided with a driving pulley 22 which is connected by a belt 23 with pulley 24 on shaft 25 of blower 20. The motor 17 thereby drives both blowers which are preferably disposed within the cold air conduit 12 and the air intake of each blower draws air from said conduit 12. Air is discharged from the auxiliary blower through discharge pipe 26 to which is connected an auxiliary air conduit 27, the opposite end of said conduit 27 being connected to air intake pipe 28 of the air spray by a sleeve 29.

The air spray comprises an air chamber 30 enclosed by bottom sides, ends and top numbered respectively 31, 32, 33 and 34. air intake pipe 28 of said spray being attached to the top 34 and communicates with the air chamber 30. The air spray is relatively flat and the top 34 thereof is provided with a plurality of perforations 35 through which air is forced from the chamber 30.

The spray is disposed within a reservoir 36 which is open at the top and is secured to the top of the furnace 10 beneath the hot air duct 14. The reservoir 36 is supplied with water from a water supply tank 37 by means of a connecting pipe 38. A float valve 39 maintains the level of the water in the supply tank 37 at substantially a constant level which corresponds with the upper water level 40 in the reservoir, said supply tank being so positioned that the level 40 in the reservoir is above the top 34 of the air spray so that air forced through perforations 35 of the spray must pass through the water in the reservoir over said spray the top face of said spray being substantially parallel with the surface of the water in the reservoir.

Air forced from the perforations 35 of the spray passes through the water in the reservoir in tiny streams or currents and such air becomes very moist. This moist or humidified air is mixed with the main air current of the heating chamber 13 above the reservoir, in the hot air duct 15, and branch ducts 15. The water in the reservoir is also heated by the furnace and such heating promotes humidification of the air from the spray.

Air from conduit 12 enters the auxiliary blower 20 through an air intake opening 41 and the amount of air thus entering said blower 20 is regulated by a valve-like door 42 which is provided with a hinge 43 adjacent the bottom thereof thereby hinging said door to the blower. The door 42 is adapted to swing downwardly, as indicated by dotted lines in Figure 5, to permit air to enter the intake opening 41. The opening and closing of the door 42 is controlled by a chain 44 which may lead to an upper room of the house or other building in which the system is installed. If desired a humidostat controlled solenoid or other well known electrical means may be used to operate the door 42 to control the volume of air admitted to the auxiliary blower to provide automatic control of the moisture content of the air in the system.

It should be noted that the auxiliary blower is adapted to provide an air pressure that is higher than that of the principal or main blower 16 as it requires more pressure to force the air through the water of the reservoir from the spray than to force same through the heating chamber about the furnace. After the air from the spray has passed through the water in the reservoir same has little pressure remaining and the main air stream from blower 16 carries the moist air through the circulating system. It is not desirable to pass all of the air through water as same would become too damp. With an auxiliary stream of air passed through water the volume of such air may be readily controlled thereby controlling accurately the amount of moisture in the circulating system.

It is thought that the invention and many of its attendant advantages will be readily understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention what I claim is:

1. In an air humidifying and moistening system for buildings, the combination of a furnace, a casing enclosing a heating chamber about the furnace, a cold air conduit operably connected with the heating chamber, a hot air outlet duct above the furnace, a blower in the cold air conduit for forcing air through the heating chamber and out the hot air duct, a water reservoir on top of the furnace and open at the top, a water supply tank, means connecting the supply tank and reservoir, a float valve in the supply tank for maintaining a constant level of water in said tank, an air spray having a plurality of openings in the top thereof, said spray being disposed in the reservoir, said supply tank being so positioned as to maintain a water level in the reservoir above the top of the spray, an auxiliary blower in the conduit, a pipe operably connecting the auxiliary blower with the air spray, means for operating both blowers simultaneously, and means for regulating the amount of air admitted into the auxiliary blower.

2. In a system of the class described, the combination of a furnace, a casing enclosing an air heating chamber about the furnace, a cold air conduit operably connected with the heating chamber, a hot air outlet duct from the heating chamber, blower means for forcing a main current of air through the cold air conduit, heating chamber and hot air outlet, a water reservoir within the chamber, means for maintaining a substantially constant level of water in said reservoir, an air spray having a substantially flat upper face and submerged in the water of the reservoir with the upper face substantially parallel with the surface of the water in the reservoir, said upper face of the spray having a plurality of small air outlets opening upwardly, an auxiliary air conduit connected with the spray, auxiliary blower means for forcing a current of air through the spray whereby small streams of air are forced through the openings thereof and through the water to humidify said air, said humidified air being introduced into the main air stream, said blower means being operably connected together, and a common source of power for said blower means.

3. In a system of the class described, the combination of a furnace, a casing enclosing an air heating chamber about the furnace, a cold air conduit operably connected with the heating chamber, a hot air outlet duct from the heating chamber, primary air circulating means for circulating air through the cold air conduit, heating chamber and hot air outlet, a water reservoir, means for maintaining a substantially constant level of water in said reservoir, an air spray submerged in the water and having a substantially flat, perforated, upper face substantially parallel with the surface of the water, an auxiliary air conduit connected with the spray, auxiliary air circulating means for forcing a current of air through the spray and water in which the spray is submerged to humidify said air, said humidified air being mixed with the air of the primary circulating means, the primary and auxiliary air circulating means being operably connected together, and means for operating both said air circulating means.

4. In a system of the class described, the combination of a furnace, a casing enclosing an air heating chamber about the furnace, a cold air conduit operably connected with the heating chamber, a hot air outlet duct from the heating chamber, primary air circulating means for a primary current of air through the cold air conduit, heating chamber and outlet duct, a water reservoir, means for maintaining a substantially constant level of water in said reservoir, an air spray submerged in the water of the reservoir, said spray having a perforated, substantially flat upper face substantially parallel with the surface of the water in the reservoir, an auxiliary air conduit connected with the spray, auxiliary air circulating means for forcing an auxiliary current of air through the spray independent of the primary air current, said auxiliary air current being forced through the perforations of the spray and through the water of the reservoir to humidify said air, said humidified air being mixed with the primary air current, and means for operating the primary and auxiliary air circulating means.

5. In a system of the class described, the combination of a furnace, a casing enclosing an air heating chamber about the furnace and having a hot air outlet, a cold air conduit operably connected with the heating chamber, primary air circulating means for circulating a primary current of air through the cold air conduit and heating chamber, a water reservoir, an air spray submerged in the water of the reservoir, said spray having a perforated flat upper surface substantially parallel with the surface of the water in the reservoir, an auxiliary air conduit connected with the spray, auxiliary air circulating means for forcing an auxiliary current of air through the auxiliary conduit and spray, said auxiliary air current being forced through the perforations of the spray and through the water of the reservoir to humidify said air, said humidified air being introduced into the primary air current, and means for operating the primary and auxiliary air circulating means.

HENRY C. HAMANN.